May 18, 1965
A. J. WEINSTEIN
3,183,773
PROJECTION POINTER
Filed April 1, 1963
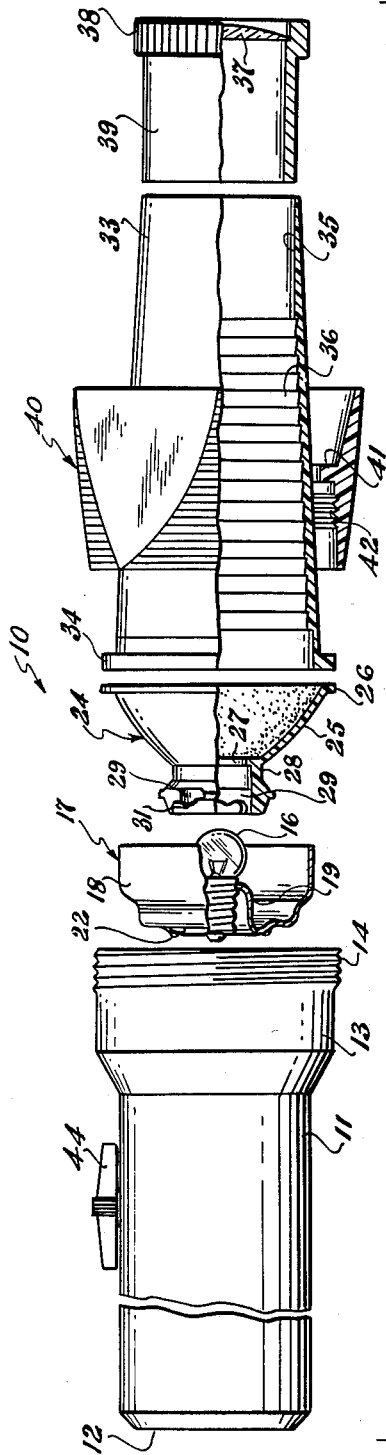
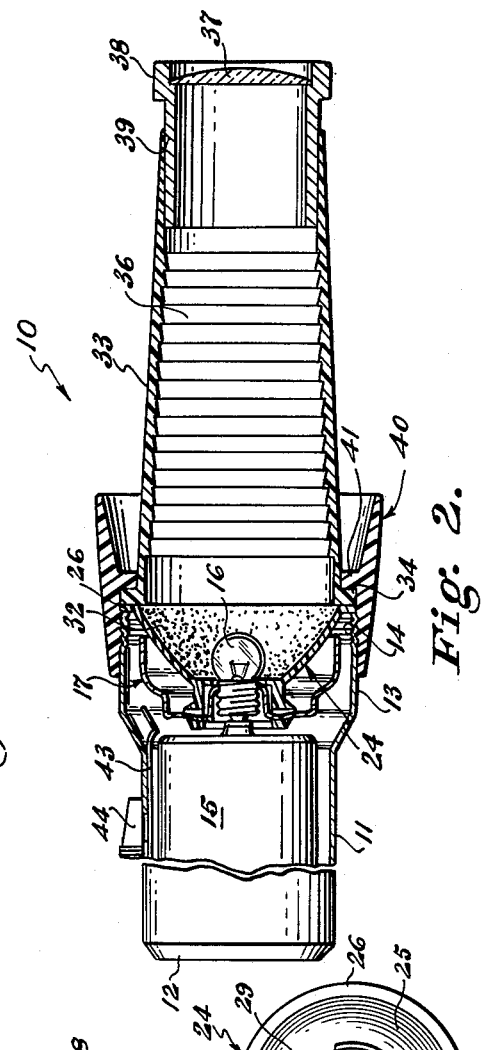
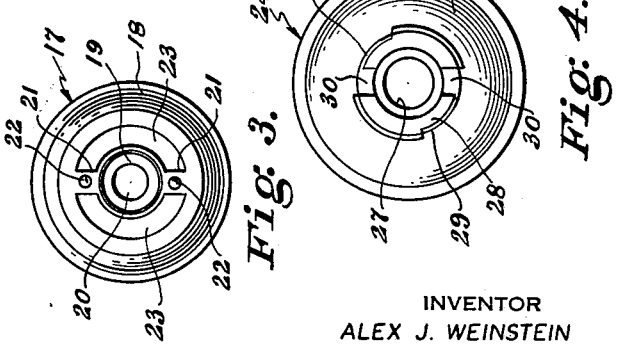
INVENTOR
ALEX J. WEINSTEIN
BY
ATTORNEY

United States Patent Office 3,183,773
Patented May 18, 1965

3,183,773
PROJECTION POINTER
Alex J. Weinstein, Mount Vernon, N.Y., assignor to The Ednalite Corporation, New York, N.Y., a corporation of New York
Filed Apr. 1, 1963, Ser. No. 269,416
3 Claims. (Cl. 88—24)

This invention relates generally to a projection pointer, and more particularly is directed to an improved, easily portable projection pointer operative to project an intensely or brightly illuminated point, line or other image on a screen, which image is clearly visible even when projected from a substantial distance onto a screen having a high level of general illumination.

Projection pointers have been provided for use in connection with the projection of motion picture films, colored slides or other visual presentations, and are operative to project an illuminated arrow or other attention focusing image which is superimposed on a main illuminated image, such as, a motion picture, transparency or other visual presentation projected on the screen for directing the audience's attention to features of the projected main image, as during lectures, demonstrations or other presentations employing such visual aids in the home, school or industry. Since the screen or other surface onto which the visual presentation is projected frequently has a relatively high level of illumination by reason of the main image projected thereon, it is apparent that the superimposed image effectively acting as a pointer to focus the audience's attention at a particular location on the main image must be very intensely illuminated. Of the previously proposed projection pointers, only those employing line current and a suitable transformer for energizing the light source have been practically effective to project a sharply defined and intensely illuminated image capable of acting as a pointer on a screen having a high level of general illumination. However, such projection pointers are relatively costly and further limit the movement of the user to the range permitted by the cord or cable extending to an outlet or source of line current. Although battery powered projection pointers have been proposed, the image projected thereby and intended to act as a pointer either is not sufficiently defined or does not have an adequate intensity of illumination so as to be clearly visible when superimposed on a main projected image having a high level of general illumination. In an attempt to avoid the foregoing inadequacy of existing battery powered projection pointers, it has been previously proposed to employ a light bulb therein having a filament in the shape of an arrow, and further to provide an optical system for projecting an image of such filament onto the screen so that, even though such image may not be sharply defined, its distinctive shape will make it visible to the audience. However, the described light bulbs with specially shaped filaments are very costly, for example, each selling for a price in the range between $1.50 and $2.50, and, by reason of the necessity of the relatively frequent replacement thereof, such special bulbs represent a substantial item of cost in the operation of the existing battery powered projection pointers.

Accordingly, it is an object of the present invention to provide a projection pointer which may be powered by conventional flashlight batteries so as to be conveniently and widely portable, and which may employ relatively inexpensive conventional flashlight bulbs of the type having a clear glass envelope, such projection pointer being designed and arranged to project a sharply defined and intensely illuminated image of the bulb filament that is clearly visible on a projection screen even when superimposed on a main motion picture, color slide or other image having a high level of general illumination.

A further object is to provide a projection pointer of the described character also capable of providing local illumination by which the user may read notes, select slides, effect the changing of films or otherwise operate the projection machine.

Still another object is to provide a projection pointer of particularly simple and inexpensive construction operative to both project a sharply defined and intensely illuminated image acting as a pointer and also to provide local illumination, as indicated above.

In accordance with an aspect of this invention, a projection pointer includes a tubular casing forming the handle thereof and adapted to contain batteries where the latter constitute the source of power, a mounting for a conventional flashlight bulb at one end of the casing, which mounting has a non-reflective surface extending around and in back of the bulb, a tapering, translucent plastic tube extending from said one end of the tube and having a light-trapping inner surface so that light rays from the bulb impinging against such surface are dispersed radially outward through the translucent tube for providing the desired local illumination while avoiding reflection of such light rays longitudinally along the tube, and a plano-convex lens mounted in a lens holder having a cylindrical portion which is axially slidable, and frictionally held in the outer or forward end portion of the translucent tube for focusing movement of the lens, whereby the latter can project a sharply defined and intensely illuminated image of the filament of the bulb against a relatively dark ground free of unwanted illumination resulting from the projection of light rays reflected from either the mounting for the bulb or the inner surface of the translucent tube.

The above, and other objects, features and advantages of the invention, will be apparent in the following detailed description of an illustrative embodiment thereof which is to be read in connection with the accompanying drawing forming a part hereof, and wherein:

FIG. 1 is an exploded, side elevational view, partly broken away and in section, of the various components making up a projection pointer in accordance with the present invention;

FIG. 2 is an axial sectional view showing the several components of the projection pointer in their assembled relationship;

FIG. 3 is a rear elevational view of a socket member forming part of the mounting for the light bulb in the projection pointer of FIGS. 1 and 2; and FIG. 4 is a rear elevational view of a insulating holder for the socket member of FIG. 3.

Referring to the drawings in detail, and initially to FIGS. 1 and 2 thereof, it will be seen that a projection pointer embodying the invention, and there generally identified by the reference numeral 10, includes an elongated tubular casing 11 having one end closed, as at 12, while its opposite or front end portion 13 is of enlarged diameter and formed with threads 14. The tubular casing 11 forms the handle of the projection pointer and is adapted to contain conventional flashlight batteries 15 (FIG. 2) which are resiliently urged toward the open end of the casing by means of the usual coil spring (not shown) secured to the closed end 12 thereof.

A conventional flashlight bulb 16, which is preferably of the type having a threaded base and a clear glass envelope, is carried by a socket member 17 preferably formed of copper or other conducting metal. The socket member 17 (FIGS. 1 and 3) includes an annular, forwardly opening shell 18 and a base or socket portion 19 disposed within shell 18 and having an opening 20 at its forward end to threadably receive the screw threads on the base of light bulb 16. The back end of socket portion 19 is joined integrally to the back end of shell 18 by means of diametrically opposed arms 21 having detents 22 pressed or struck therefrom. As shown on FIG. 3, arcuate slots 23 are defined between the back ends of shell 18 and socket portion 19 at the opposite sides of the arms 21.

Socket member 17 is supported by a holder 24 (FIGS. 1 and 4) which is preferably formed of an insulating plastic material. The holder 24 has a forwardly flaring side wall 25 defining an opening of relatively large area at the front of the holder and there being formed with an outwardly directed flange or rim 26 having an outer diameter substantially equal to that of the open front end portion 13 of casing 11. The back end of side wall 25 extends around a reduced diameter opening 27 dimensioned to permit the light bulb 16 to project forwardly therethrough (FIG. 2), and a hollow hub 28 extends rearwardly from the back end of side wall 25 around opening 27 and is formed with a pair of bayonet slots 29 opening at diametrically opposed locations at the rear end surface of hub 28, as at 30 on FIG. 4.

In assembling the socket member 17 with the holder 24, the socket portion 19 with the bulb 16 screwed therein is inserted forwardly into the hollow hub 28 of holder 24 and the arms 21 are aligned with the openings 30 of bayonet slots 29. Then the socket member 17 is pressed forwardly relative to holder 24 and turned with respect to the latter so that the arms 21 are secured in the circumferentially extending portions of the slots 19 and there held by engagement of the detents 22 with notches 31 (FIG. 1) formed along the bayonet slots. As shown on FIG. 2, when the socket member 17 and holder 24 are thus assembled together, the light bulb 16 projects forwardly through the central opening 27, and the side wall 25 extends around and in back of the light bulb and is provided with a non-reflective inner surface, for example, of a black paint having a matte or flat finish, as indicated at 32.

The projection pointer 10 further includes a forwardly tapering, open-ended translucent tube 33 preferably formed of a plastic material, for example, methyl methacrylate having white pigment dispersed therein. Translucent tube 33 has an outwardly directed flange or rim 34 at its back or relatively large diameter end and a cylindrical, inner surface portion 35 at its front end. Between its back or flanged end and the cylindrical front end portion 35, the translucent tube 33 has a light-trapping inner surface 36 which is effective to trap light rays traveling along the tube toward the front end of the latter and impinging against the surface 36, and to disperse the trapped light rays radially outward through the wall of the translucent tube. As shown on FIGS. 1 and 2, the light-trapping inner surface 36 of tube 34 is preferably constituted by an axial series of contiguous, circumferential grooves having saw-tooth cross-sections.

By reason of the taper of the translucent tube 33 and the saw-tooth configuration of the circumferential grooves, the latter present annular, radially directed surfaces of progressively decreasing diameter facing axially toward the back end of tube 33 so that light rays entering at the back end of the tube and impinging against the inner surface 36 are not reflected from such surface in the axial direction toward the forward end of tube 33, but rather enter the wall of the translucent tube and are dispersed radially outward.

A plano-convex lens 37 is mounted in a lens holder 38 having a rearwardly directed barrel or cylindrical portion 39 formed with an outer diameter substantially equal to the diameter of the cylindrical inner surface portion 35 so as to be slidable and frictionally held in the front end portion of translucent tube 33, as shown on FIG. 2.

The projection pointer 10 is completed by a shroud 40 which may be formed of a suitably rigid opaque plastic material. The shroud 40, which preferably has a non-circular external cross-sectional configuration, particularly at its forward end so as to avoid rolling of the pointer when placed on a flat surface, is provided with an inwardly directed flange 41 having an inner diameter substantially equal to the outer diameter of translucent tube 33 immediately in front of the flange 34 of the latter. Shroud 40 further has internal threads 42 formed therein in back of flange 41 and mating with the threads 14 on the enlarged forward end portion 13 of casing 11.

In assembling together the various above described components of projection pointer 10, the usual flashlight batteries 15 are initially installed in casing 11. Then the translucent tube 33 is inserted through the back end of shroud 40 until the flange 34 of tube 33 engages against the back surface of flange 41. The socket member 17 and holder 24 assembled together as previously described herein are next inserted into shroud 40 from the back of the latter so that the flange 26 at the front opening of holder 24 bears against the flange 34 at the back end of tube 33. Finally, threads 42 of shroud 40 are screwed onto threads 14 at the front end portion 13 of casing 11 until the front end edge of the latter bears against flange 26 of holder 24, thereby to securely clamp the mounting for the light bulb 16 constituted by holder 24 and socket member 17 as well as the translucent tube 33 at the front end of casing 11.

In the case of a battery-operated projection pointer, as shown, the central terminal of the foremost battery is urged into engagement with the central contact of the base of light bulb 16, while the socket member 17 establishes electrical contact with the shell of the base of the light bulb. In order to complete the circuit for energizing the light bulb 16, the casing 11 may be provided with a conventional switch constituted by a slide contact 43 disposed within casing 11 and movable along the latter by an externally disposed button 44 so as to effect contact with the shell 18 of socket member 17.

When the bulb 16 is thus energized, the lens holder 38 is axially adjusted with respect to the translucent tube 33 so that the lens 37 will focus a sharply defined and illuminated image of the filament of bulb 16 upon a remote screen or other surface. By reason of the fact that the surface 32 of holder 24 which extends around and in back of light bulb 16 is non-reflective, and further by reason of the light-trapping inner surface 36 of translucent tube 33, lens 37 will only project an image of the filament of bulb 16, and will not project a surrounding light field or illuminated background constituted by dispersed or reflected light rays. Thus, the projected image of the filament of light bulb 16 will be sharply defined so as to be clearly visible even when superimposed on a projected motion picture or other image having a relatively high level of general illumination. Since the projected image of the filament of light bulb 16 is sharply defined and intensely illuminated, such image need not have an arrow or other distinctive shape for the purpose of being clearly perceivable when superimposed over a motion picture or other main illuminated image. Thus, the bulb 16 may be a relatively inexpensive conventional flashlight bulb. Further, by reason of the light-trapping characteristics of the inner surface 36 of tube 33 and the fact that the latter is formed of a translucent material, light is emitted radially outward from the tube 33 to provide diffused local illumination that may be employed by the user for reading notes, identifying slides or as an aid in changing films or otherwise operating a motion picture or other projector.

Although the illustrated projection pointer 10 is battery operated, it will be understood that a projection pointer embodying the invention may be provided for operation from power lines and, in that event, the casing 11 may conveniently house a transformer for converting the available current to a voltage usable by the bulb 16. The invention has been illustrated in its application to a battery operated projection pointer in order to demonstrate that, even with that source of current, a clearly visible, and sharply defined image of the bulb filament may be obtained.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claims.

What is claimed is:

1. A projection pointer comprising
   (A) a casing open at its front end,
   (B) means supporting a light bulb at said front end of the casing, and having a forwardly opening, non-reflective surface extending around the light bulb,
   (C) means in said casing for energizing the light bulb,
   (D) a translucent open-ended tube extending forwardly from said front end of the casing, said tube tapering toward its front end so that rays of light from the filament of said bulb impinging against said tube are directed radially outward through the latter, and
   (E) a plano-convex lens having a mount carried by the front end of said tube and adjustable axially with respect to said tube to cause said lens to project substantially only an image of the filament of the light bulb focussed on a remote projection surface.

2. A projection pointer as in claim 1; wherein said tapering tube has a light-trapping inner surface.

3. A projection pointer as in claim 1; wherein said light-trapping inner surface of the tube is constituted by an axial series of contiguous circumferential grooves having saw-tooth cross-sectional profiles to define radially directed annular surfaces facing axially toward the light bulb.

References Cited by the Examiner

UNITED STATES PATENTS

| | | | |
|---|---|---|---|
| Re. 15,022 | 1/21 | Burgess | 88—24 |
| 1,912,487 | 6/33 | Matera | 240—41.35 |
| 2,277,147 | 3/42 | Rogers | 88—24 |
| 2,647,254 | 7/53 | Brunnhoelzl | 240—10.6 X |
| 2,690,503 | 9/53 | Garland | 240—41 X |
| 2,838,750 | 6/58 | Rose | 240—10.6 X |
| 2,855,499 | 10/58 | Lewis | 240—10.6 |
| 3,007,110 | 10/61 | Rosenstrach | 240—10.68 X |
| 3,078,761 | 2/63 | Zorn | 240—10.6 X |

FOREIGN PATENTS

| | | |
|---|---|---|
| 559,098 | 6/58 | Canada. |
| 742,804 | 1/56 | Great Britain. |

NORTON ANSHER, *Primary Examiner.*